G. SEGSCHNEIDER.
BREAD SLICING MACHINE.
APPLICATION FILED FEB. 28, 1920.

1,396,290.

Patented Nov. 8, 1921.
2 SHEETS—SHEET 1.

Inventor
Gustav Segschneider
By his Attorney

G. SEGSCHNEIDER.
BREAD SLICING MACHINE.
APPLICATION FILED FEB. 28, 1920.
1,396,290.
Patented Nov. 8, 1921.
2 SHEETS—SHEET 2.
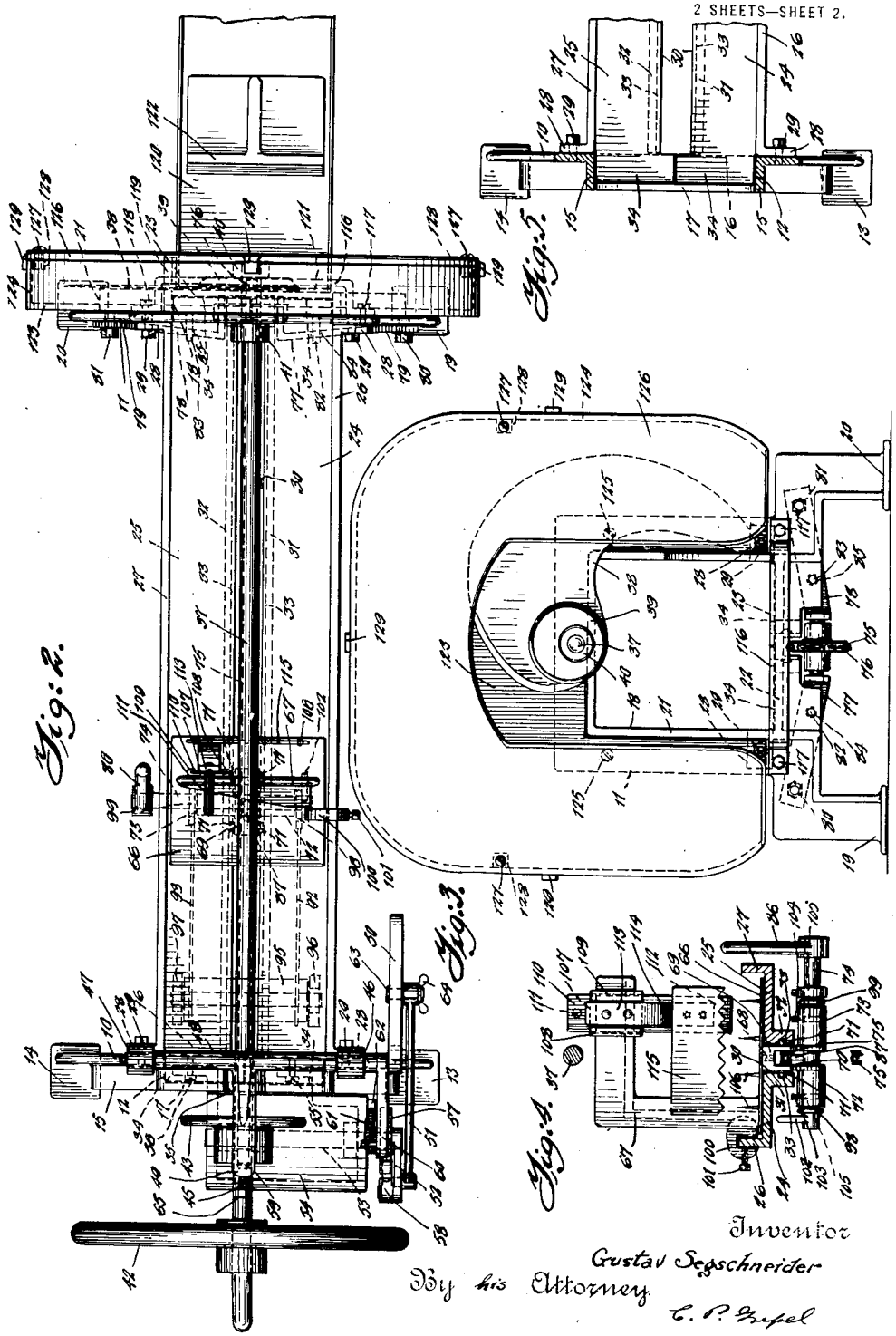
Inventor
Gustav Segschneider
By his Attorney

UNITED STATES PATENT OFFICE.

GUSTAV SEGSCHNEIDER, OF YONKERS, NEW YORK.

BREAD-SLICING MACHINE.

1,396,290.

Specification of Letters Patent.   Patented Nov. 8, 1921.

Application filed February 28, 1920. Serial No. 362,050.

*To all whom it may concern:*

Be it known that I, GUSTAV SEGSCHNEIDER, a citizen of the United States, and resident of the city of Yonkers, county of Westchester, and State of New York, have invented certain new and useful Improvements in Bread-Slicing Machines, of which the following is a description.

The present invention relates to improvements in bread slicing machines, and has for an object to provide a machine of this character by means of which bread may be sliced uniformly with facility and with a relatively high degree of speed.

Another object is to provide adjustment means by which the machine may be made to accommodate loaves of different lengths, and further to provide adjustment means adapted to enable the cutting of slices of any desired thickness.

A further object is to provide automatic means adapted to return the bread carriage to its initial position when the loaf is completely sliced without the necessity of any manual manipulation of the machine.

It is further proposed to provide a machine of relatively simple construction and manufacture, and which will not readily get out of order.

With these and other objects in view, an embodiment of my invention is shown in the accompanying drawings, and this embodiment will be hereinafter more fully described with reference thereto, and the invention will be finally pointed out in the claims.

In the accompanying drawings:

Fig. 2 is a plan view thereof;

Fig. 3 is a front view with the slice receiving pan removed;

Fig. 4 is a vertical sectional view taken along the line 4—4 of Fig. 1, and,

Fig. 5 is a horizontal sectional view taken along the line 5—5 of Fig. 1.

Similar reference characters indicate corresponding parts throughout the several figures of the drawings.

Figure 1:
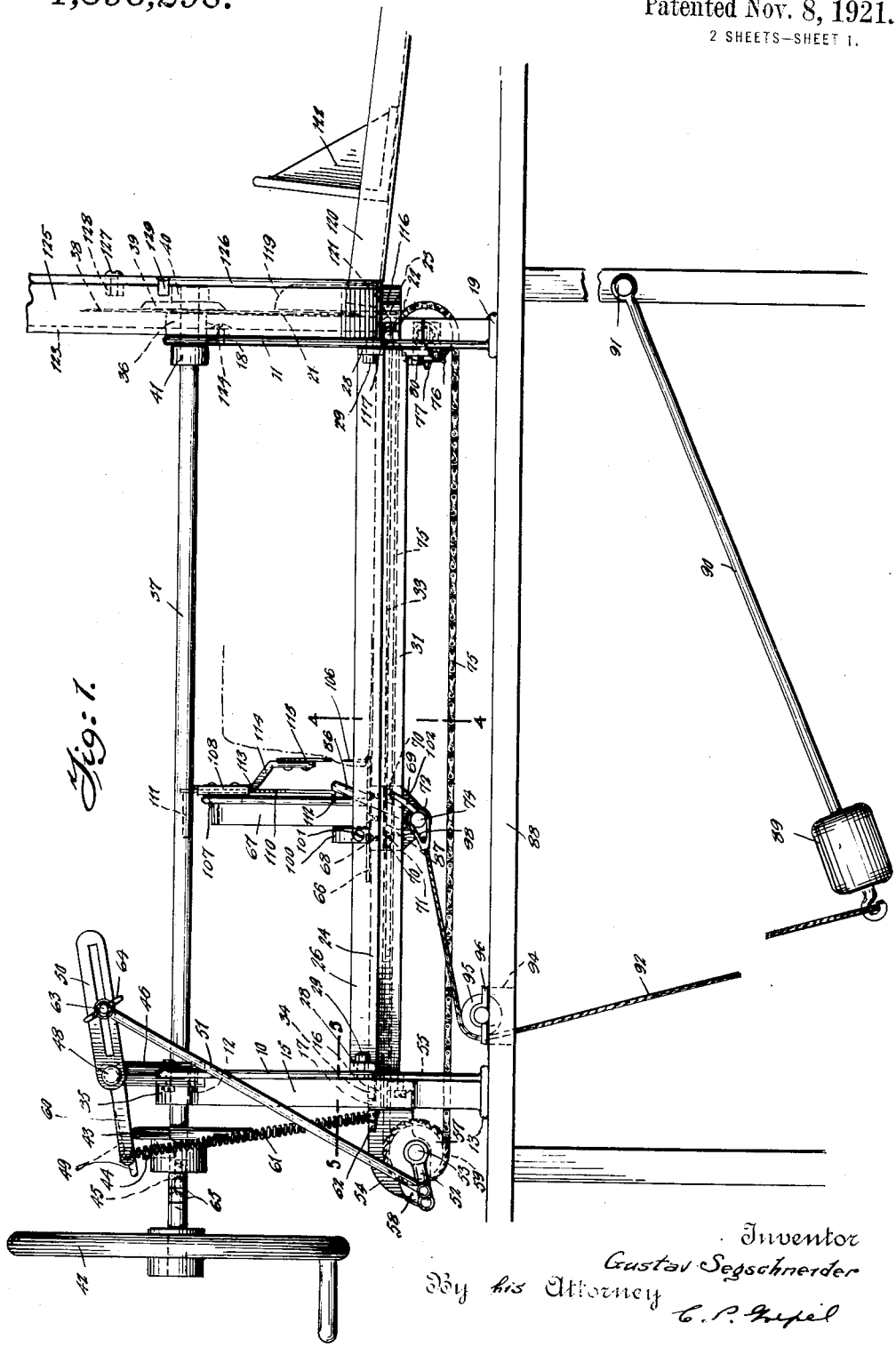
Figure 1 is a side elevation of the bread slicing machine according to the present embodiment of my invention.

Referring to the drawings, the embodiment disclosed therein comprises a pair of end standards or supports 10 and 11 in opposed relation to each other, and are of substantially similar construction. The rear support 10 is substantially rectangular in shape, being provided with a rectangular opening 12, and at its base with offset legs and feet 13 and 14. A rearwardly extending flange 15 is provided along the upper edge of the opening and down both sides of the feet, a transverse base portion 16 being provided between the side flanges extending rearwardly from the base of the opening flush therewith, and having at its rear edge an upstanding flange 17.

The front support 11 is substantially the same in shape as the support 10, being reversed in position, however. A rectangular opening 18 is provided therein, and legs and feet 19 and 20 support it, a flange 21 extending along the upper edge of the opening and down the sides to the feet, a transverse base 22 provided with a flange 23 extending forwardly from the lower edge of the opening.

The longitudinal bread pan supported between the supports 10 and 11 is formed of two sections 24 and 25, identical in form, having upstanding sides 26 and 27 provided with outwardly bent ends 28 at their ends, engaging the faces of the supports 10 and 11, and being secured thereto by screws 29. The adjacent edges of the sections are spaced from each other to form a longitudinal slot 30, and are provided with downwardly extending flanges 31 and 32, each provided with a longitudinal groove or channel 33 adapted to engage the bread carriage, as will be hereinafter more fully pointed out.

Lateral extensions 34 at the ends of the pan sections engage and rest upon the transverse base portions 16 and 22 of the supports abutting and being flush with the upper surface of the flanges 17 and 23, and contacting with each other at their longitudinal inner edges, as clearly indicated in Fig. 5. Bearings 35 and 36 are provided centrally of the upper portion of the supports 10 and 11, in which is journaled a shaft 37, to the forwardly projecting end of which there is secured a cutting knife 38 attached to an eccentric plate 39, provided with a hub 40 pinned or keyed to the shaft, a collar 41 being provided upon the shaft contiguous to the under surface of the support 11 to prevent axial play or dislocation of the knife. The knife has the shape of a partial crescent, and its cutting edge is concentric with relation to the axis of the shaft.

At its rearwardly projecting end the shaft is provided with a hand wheel 42, and between the hand wheel and the support 10 there is mounted an eccentric cam 43 adapted, as will presently appear, to operate the feed mechanism and adjustably fixed in position by means of a set screw 42 engaging the longitudinal groove 45 in the shaft.

Upon the upper portion of the support 10 there are mounted two bearing brackets 46 and 47, in which there is journaled a shaft 48 having formed thereon a rearwardly projecting arm 49 engaging the cam 43 and a forwardly extending slotted arm 50 connected by a rod 51 to a lever 52 loosely mounted upon the end of a shaft 53 journaled in a sprocket casing 54 fixed to the support 10 beneath the base 17 by means of screws 55 and 56. A ratchet 57 is provided on the shaft 53, which is engaged by a spring pressed pawl 58 at the end of the lever 52, and within the casing there is mounted upon the shaft 53 a sprocket gear 59.

A rearwardly projecting arm 60 is provided on the shaft 48, connected by a spring 61 to a lug 62 on the side of the casing 54, and is adapted to retain the arm 49 in engagement with the cam 43, which, upon rotation, rocks the shaft 48, swinging the lever 50, and through the pawl and ratchet mechanism intermittently rotates the sprocket shaft 53 to feed the bread carriage, as will be hereinafter more fully pointed out. The degree of rotation, and therefore the amount of feed, and the thickness of the slices of bread may be adjusted by changing the position of the connection of the rod 51 to the lever 50, the bolt 63 and wing nut 64 permitting this. Regulation may also be effected by shifting the position of the cam 43 upon the shaft 37 by loosening the set screw 44, and to the end of enabling definite predetermined adjustments the shaft is provided with a series of markings 65 characterized, as for instance, by the numbers 1, 2, 3, 4, and thus the bread may be cut to No. 1 thickness, or No. 2 thickness, etc.

The bread carriage comprises a relatively thin plate 66 disposed in the pan having an angular arm 67 formed thereon. At the under side of the plate there is secured by means of screws 68 a depending member 69 disposed within the slot 30, and provided at its sides with lugs 70 engaging the channels 33 in the flanges 31 and 32. The member 69 is channeled at its under side, as at 71, and provided with laterally extending sleeve portions 72 and 73, in which is journaled a shaft 74, a continuous sprocket chain 75 extending over the sprocket wheel 59 and also over a sprocket wheel 76, mounted upon the support 11 between a pair of angular bracket bearing members 77 and 78, extends at its upper forward moving portion through the channel 71 of the member 69 above the shaft 74. The bearing members 77 and 78 are of spring metal, bent away from the inner face of the support 11, as at 79, and secured thereto by screws 80 and 81 respectively, having relatively large heads and adapted, when tightened down, to draw the sprocket wheels forwardly, tensioning the said members 77 and 78, and drawing the sprocket chain taut, and also acting, when the chain is in use, to automatically take up any slack that may occur in the chain. A pair of guide pins 82 and 83 engaging apertures 84 and 85 in the members 77 and 78 retain the same against pivotal movement about the screws 80 and 81.

At the end of the shaft 74 there is secured a handle 86, and within the channel 71 there is provided upon the shaft a hook-shaped finger 87, which upon rotation of the shaft 74, by means of the handle, may be engaged or disengaged from one of the openings of the sprocket, and when engaged, as indicated at Fig. 1, will cause the bread carriage to be moved forward intermittently with the chain.

At the under side of the supporting table 88, there is provided a counter weight 89 mounted upon a lever 90 pivotally supported at 91, and connected to the carriage by means of a pair of cords or cables 92 and 93 extending through a slot 94 in the cable over a roller 95, rotatably mounted in bearings 96 and 97, the ends of the cords or cables being connected to the shaft 74 of the carriage by loops or eyelet members 98 and 99, the weight adapted to hold the carriage against an adjustable stop block 100 mounted upon the side 26 of the pan, and adjustably fixed theron by a set screw 101.

A finger 102 is provided on the shaft 74 contiguous to the loop member 98, and adapted by engagement with the under side of the pan to limit the turning movement of the shaft 74 when turned by means of the handle to disengage the finger 87 from the chain, and also prevents displacement of the loop member 98. A collar 103 upon the shaft 74, contiguous to the loop member 99, prevents the displacement of this member. The shaft 74 is held against axial movement by means of set screws 104 engaging grooves 105 in the shaft. At the forward edge of the plate 66 there are provided a plurality of upstanding prongs or teeth 106 adapted to engage the bread to be cut, and upon the arm 67 there is secured a plate 107 having spring side flanges 108 and 109, a vertically slidable plate 110 being mounted therein between the flanges provided at its upper end with a handle 111 and at its lower end with a stop flange 112 adapted to limit the upward movement of a bar 113 secured to the face of the plate 110 and bent forwardly, as at 114, having secured thereto a blade member 115 disposed directly above the prongs 106, and having saw teeth at its lower edge. The bread is preferably secured to the carriage by engaging the lower corner with the prongs or teeth 106, and then pressing the upper portion of the loaf forwardly, as indicated in dot and dash lines, Fig. 1, and thereupon pressing the plate 115 downwardly into engagement with the same to grip it upon the prongs 106. In this manner practically the whole loaf may be sliced with only wastage of the very small corner engaged by the prongs 106, and it will be understood that this wastage in most establishments may be used for other purposes.

In operation the carriage is intermittently moved forward by turning the handle 42, and at the same time the cutting knife is rotated, the bread being intermittently moved into cutting relation therewith, the cam 43 being so timed with relation to the cutting knife, that it operates to feed the carriage forwardly at a time when the opening 18 of the support 11 is entirely free of the knife 38, as indicated in Fig. 3.

When the carriage has moved forward to its full extent, so that the loaf is completely sliced, the handle 86 engages the head of the screw 29 at one side of the pan, turning the shaft 74, and disengaging the finger 87 from the sprocket chain, whereupon the weight 89 draws the carriage back to its initial position against the stop 100, whereupon another loaf is secured to the carriage and the same is connected to the sprocket chain by manually throwing the handle 86 forwardly which engages the finger 87 with the sprocket chain.

Upon the support 11 at its forward side, there is provided a cross bar 116 secured to the side portion of the support by means of screws 117 and 118, and bent forwardly into parallel and spaced relation to the lower side of the opening 18 to form a slot through which the end of the cutting knife moves as it is turned. Upon the bar 116 at one side thereof there is formed a stop 119 spaced from the support 11 at its inner edge to permit passage of the knife, and adapted to back up the projecting portion of the loaf as it is being cut, preventing it from being carried sidewise by the blade, and causing it to fall into the receiving pan 120, the flanged end 121 of which is hooked over the bar 116.

A supporting L-shaped slide piece 122 is disposed in the pan 120, of such weight as to support the bread upright thereon, as it is cut, and be gradually forced along the receiving pan by the feeding movement of the loaf.

The cutting knife is protected by means of a guard secured to the support 11, and comprising a plate 123 attached by screws 124 to the inner face of the said support 11, and provided with a forwardly extending flange 125 disposed about the edge of the knife and to the forward surface of which there is secured a cover plate 126 by means of screws 127 engaging enlargements 128, formed upon the flange 125, positioning lugs 129 being provided upon the plate which embrace the outer side of the flange 125. This guard, it will be noted, may be conveniently removed with facility in order to sharpen the knife when desired.

It will be understood that spring means, or other suitable well-known means may be used in substitution of the weight 89.

I have illustrated and described a preferred and satisfactory embodiment of my invention, but it is obvious that changes may be made therein within the scope and spirit thereof, as defined in the appended claims.

I claim:

1. A slicing machine comprising a support for the material, cutting means disposed relatively to the support for slicing the material, a carriage disposed upon said support and adapted to be engaged with the material, means disposed longitudinally of said support and adapted to intermittently move said carriage toward said cutting means, a counter weight, means connecting said counter weight to said carriage, and means adapted to automatically disengage said carriage from said means for intermittently feeding the same at the completion of its forward feeding movement toward said cutting means, said counter weight adapted to return said carriage to its initial position.

2. A slicing machine comprising a support for the material, cutting means disposed relatively to the support for slicing the material, a carriage disposed upon said support and adapted to be engaged with the material, means disposed longitudinally of said support and adapted to intermittently move said carriage toward said cutting means, a counter weight, means connecting said counter weight to said carriage, means adapted to automatically disengage said carriage from said means for intermittently feeding the same at the completion of its forward feeding movement toward said cutting means, said counter weight adapted to return said carriage to its initial position, and an adjustable stop adapted to limit the return movement of said carriage to its initial position.

3. A slicing machine comprising cutting means, a carriage for moving the material into said cutting means, a conveyer, means for driving said conveyer, controllable means for engaging said carriage with the conveyer, means for automatically disengaging said controllable means from the conveyer upon the completion of the forward movement of said carriage, and means to restore the carriage to an initial position automatically upon its disengagement from the conveyer.

4. A slicing machine comprising a support for the material, a continuously rotative shaft, a cutter on said shaft for passing through material held on said support, a continuous feed chain disposed longitudinally of said support, sprocket gears at the ends of said support engaging said chain, means operatively connecting one of said sprocket gears to said shaft to cause said chain to be intermittently moved forwardly toward said cutting means, a carriage for the material, and means for connecting said carriage to said chain to intermittently feed said carriage forwardly.

5. A slicing machine comprising a support for the material, a continuously rotative shaft, a cutter on said shaft for passing through material held on said support, a continuous feed chain disposed longitudinally of said support, sprocket gears at the ends of said support engaging said chain, means operatively connecting one of said said sprocket gears to said shaft to cause said chain to be intermittently moved forwardly toward said cutting means, a carriage for the materials, means for connecting said carriage to said chain to intermittently feed said carriage forwardly, and a yieldable bracket supporting one of said sprocket gears and adapted to automatically take up the slack in said chain.

6. A slicing machine comprising a support, cutting means mounted on said support, a carriage movable along said support, a conveyer running independently of said carriage and being intermittently driven, controllable means for causing engagement between said carriage and conveyer, a counterweight lifted by said carriage on its forward movement and adapted to return the carriage to initial position when the same is released from the conveyer, and means engageable with said controllable means for effecting the disengagement between carriage and conveyer at the end of the forward movement of the former.

7. A slicing machine comprising cutting means, a carriage adapted to feed material to said cutting means, impaling means on the carriage for receiving the rear lower portion of the material to be cut, a plate secured upon the upper forward portion of the carriage and having spring flanges providing a vertical guideway therebetween, a slidable plate mounted between said flanges, a handle on the upper end of the plate above said carriage and flanges, said slidable plate also having a stop flange at its lower portion for coöperating with the spring flanges, and a blade member carried by and forwardly of said slidable plate and directly above the impaling means, said blade member being disposed at a lower level than the rear top portion of the material whereby such blade member and impaling means may clamp therebetween a portion of the material drawn rearwardly from the lower portion thereof.

8. A slicing machine comprising a support for the material, a continuous rotative shaft, a cutter on said shaft for passing through the material held on such support, means adapted to feed the material intermittently forward toward said cutter, means operatively connecting said last-named means to said shaft, and including a cam mounted on said shaft, said cam being adjustable on said shaft to vary the degree of the intermittent movement of said feed means, and markings on said shaft adapted to coöperate with said cam to indicate predetermined degrees of feed.

9. A slicing machine comprising a support, a pair of standards carrying said support, said support consisting of a pair of mated members spaced apart to provide a longitudinally extending slot between them and having flanges adapted to rest upon said support and with other flanges adapted to engage one face of said support, fastening means passing through the last mentioned flanges and the support, a conveyer traveling beneath said slot, a carriage movable on said members, means for connecting the carriage with the conveyer through said slot, cutting means, and driving means for the cutting means and for the conveyer.

10. A slicing machine comprising a support for the material, cutting means disposed relatively to the support for slicing the material, a carriage disposed upon said support and adapted to be engaged with the material, means adapted to intermittently move said carriage toward said cutting means, means adapted to disengage the carriage from said last named means when such carriage arrives at one end of its movement, and counter-weighting means in connection with the carriage and adapted to return the same to the other end of its movement when the same is released from said first mentioned means.

11. In a bread cutter, the combination of a knife, a bread carrier adapted to be intermittently moved toward the knife, means for actuating the carrier, and means for releasing the carrier from its actuating means at the end of the latter and returning it to its starting point.

12. In a bread cutter, the combination of a knife, a bread carrier, means for advancing the carrier intermittently to any desired extent, means for connecting the carrier to the advancing means, means for releasing the carrier from its advancing means when it reaches the knife, and means for returning the carrier to the starting point.

13. In a bread cutter, the combination of a knife, a bread carrier, means for advancing the carrier intermittently, means for regulating the speed of the carrier, a movable part on the carrier connecting the carrier and the advancing means, means for withdrawing the movable part to release the carrier from its advancing means at the end of the advancing movement, and means for returning the carrier to its starting point while the movable part is withdrawn.

14. In a bread cutter, the combination of a knife, a bread carrier, advancing means for the carrier operating in one direction intermittently, a movable part connecting the carrier with the advancing means, means to disconnect said movable part, and means for returning the carrier to its starting point while the movable part is so disconnected.

15. In a bread slicing machine, a cutter, and means including an endless chain and a cross head removably engaged therewith for feeding the bread to the cutter, means for releasing the cross-head from the chain at the end of the advance of the cross-head, means independent of the said chain for moving said cross-head backward upon its release and an adjustable device adapted to cause said cross-head to be reëngaged with the chain at different points.

In testimony that I claim the foregoing as my invention, I have signed my name hereunder.

GUSTAV SEGSCHNEIDER.